(12) United States Patent
Rieger et al.

(10) Patent No.: US 6,781,007 B2
(45) Date of Patent: Aug. 24, 2004

(54) PROCESS FOR PREPARING PARTIAL HYDROLYSATES OF ORGANOMETALLIC COMPOUNDS OR TRANSITION METAL CATALYSTS IMMOBILIZED ON INERT SUPPORT MATERIALS

(75) Inventors: Rainer Rieger, Lünen (DE); Ralf Alexander Wendt, Leverkusen (DE); Thomas Wanke, Werne (DE)

(73) Assignee: Crompton GmbH, Bergkamen (DE)

( * ) Notice: Subject to any disclaimer, the term of this patent is extended or adjusted under 35 U.S.C. 154(b) by 0 days.

(21) Appl. No.: 10/316,657

(22) Filed: Dec. 11, 2002

(65) Prior Publication Data

US 2003/0139618 A1 Jul. 24, 2003

(30) Foreign Application Priority Data

Dec. 11, 2001 (DE) .......................................... 101 60 634

(51) Int. Cl.[7] ................................................. C07F 5/66
(52) U.S. Cl. ........................ 556/182; 556/118; 556/121; 556/122; 556/189; 260/665 R; 502/150; 502/152
(58) Field of Search .............................. 556/118, 121, 556/122, 182, 189; 260/665 R; 502/150, 152

(56) References Cited

U.S. PATENT DOCUMENTS

| | | | |
|---|---|---|---|
| 4,921,825 A | 5/1990 | Kioka et al. ................. | 502/104 |
| 5,026,797 A | 6/1991 | Takahashi .................... | 526/124 |

FOREIGN PATENT DOCUMENTS

| | | |
|---|---|---|
| DE | 2516284 | 8/1977 |
| EP | 0369675 B1 | 5/1993 |
| EP | 0567952 A1 | 11/1993 |
| EP | 0442725 B1 | 10/1995 |
| EP | 063624 B1 | 8/1998 |
| EP | 0650967 B1 | 11/1998 |

OTHER PUBLICATIONS

W. Kaminsky et al. (1988) "Polymerization of Olefins with Homogenous Zirconcene/Alumoxane Catalysts", Polyhedron, vol. 7, No. 22/23, pp. 2375–2381.
James C. W. Chien et al. (1991) "Olefin Copolymerization with Metallocene Catalysts III, Supported Metallocene/Methylaluminoxane Catalyst for Olefin Copolymerization ", Journal of Polymer Science Part A. Chem., vol. 29, pp. 1603–1607.
Rompp Chemie Lexikon (1990) 9, Auflage, Georg Thieme Verlag Stuttgart, New York, S. 2299 ff.
W. Kaminsky (1981) "Neues uber Ziegler–Natta–Katalyse", Chem. Tech. Lab 29, pp. 373–377; and W. Kaminsky (1986) "Olefinpolymerization with Highly Active Soluble Zirconium Compounds Using Aluminoxane As Cocatalysts", Makromol. Chem., Macromol. Symp. 3, pp. 377–387.

*Primary Examiner*—Porfirio Nazario-Gonzalez
(74) *Attorney, Agent, or Firm*—Scully, Scott, Murphy & Presser

(57) ABSTRACT

The invention relates to a process for preparing partial hydrolysates of organometallic compounds and to a process for preparing partial hydrolysates of organometallic compounds, in particular alkylaluminoxanes, or transition metal catalysts immobilized on inert support materials and also to the products prepared by this process.

28 Claims, 1 Drawing Sheet

Figure
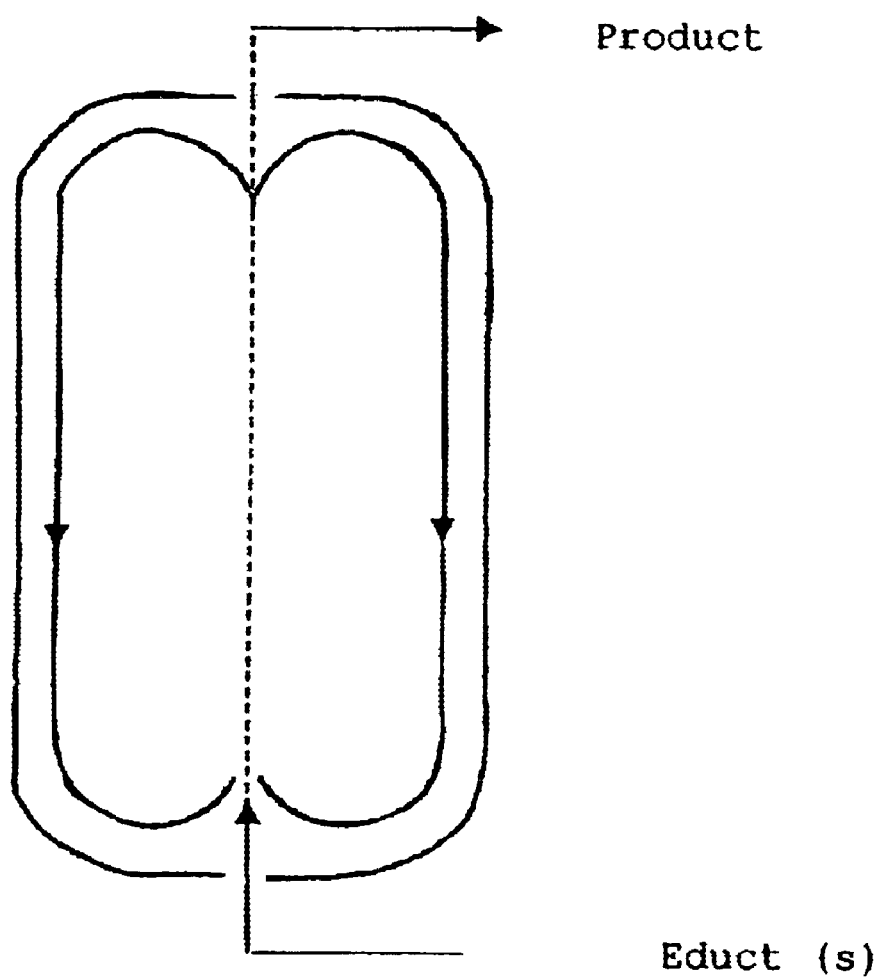

PROCESS FOR PREPARING PARTIAL HYDROLYSATES OF ORGANOMETALLIC COMPOUNDS OR TRANSITION METAL CATALYSTS IMMOBILIZED ON INERT SUPPORT MATERIALS

The invention relates to a process for preparing partial hydrolysates of organometallic compounds and to a process for preparing partial hydrolysates of organometallic compounds or transition metal catalysts immobilized on inert support materials and also to the products prepared by this process.

Transition metal catalysts comprising transition metal compounds and organometallic compounds such as alkylaluminoxanes, in particular methylaluminoxane (MAO), are gaining increasing importance as essential constituents of a new generation of catalyst systems for preparing polyolefins ('single-site catalysts'). These new catalysts consist, as is already known from classical Ziegler-Natta catalysis, essentially of a transition metal compound as catalyst and an alkylaluminoxane as organoaluminium cocatalyst component. As transition metal compound, preference is given to using cyclopentadienyl, indenyl or fluorenyl derivatives of elements of group IVa of the Periodic Table of the chemical elements. In contrast to conventional Ziegler-Natta catalysts, such systems have a high activity and productivity and, in addition, not only the ability to control the product properties in a targeted manner as a function of the components used and the reaction conditions, but also open up a route to hitherto unknown polymer structures having very promising properties with a view to industrial applications.

Many publications concerned with the preparation of specific polyolefins by means of such catalyst systems have appeared in the literature. However, they virtually all have the disadvantage that a large excess of alkylaluminoxanes, based on the transition metal component, is necessary to achieve acceptable productivities (the ratio of aluminium in the form of the alkylaluminoxane to transition metal is usually about 1000:1—cf. W. Kaminsky et al., Polyhedron, Vol. 7, No. 22/23 (1988) 2375 ff). Due to the high price of alkylaluminoxanes and also due to additional polymer work-up steps ('deashing steps') required in some cases, polymer production on an industrial scale on the basis of such catalyst systems would frequently be uneconomical. In addition, the toluene which is frequently used as solvent for the formulation of alkylaluminoxanes, in particular methylaluminoxane, is becoming increasingly undesirable for reasons of storage stability of the formulations (strong tendency to form gel), and also with a view to the applications of the polyolefins which finally result.

A significant reduction in the amount of alkylaluminoxane required for a given amount of transition metal component can be achieved by applying alkylaluminoxane to inert support materials, preferably $SiO_2$ (J. C. W. Chien, D. He, J. Polym. Science Part A, Polym. Chem., Vol. 29, 1603–1607 (1991)).

Furthermore, such supported materials have the advantage of being able to be separated off readily in the case of polymerizations in a condensed phase (preparation of high-purity polymers) or being able to be used as free-flowing powders in modern gas-phase processes, with the particle morphology of the polymer being able to be set directly by means of the particle shape of the support. Furthermore, alkylaluminoxanes immobilized on supports as dry powders are physically more stable than solutions having a comparable Al content. This applies particularly to methylaluminoxane which, as mentioned above, tends to form gel in toluene solution after a certain storage time.

A number of possible ways of immobilizing alkylaluminoxane on supports have been described in the literature.

EP 0 369 675 describes a process in which the immobilization of alkylaluminoxanes is achieved by reaction of an about 10% strength solution of trialkylaluminium in heptane with hydrated silica (8.7% by weight of $H_2O$).

EP 0 442 725 describes a process in which the immobilization is effected by reaction of a toluene/water emulsion with an about 7% strength solution of trialkylaluminium in toluene in the presence of silica at temperatures of from –50° C. to +80° C.

EP-A-0 567 952 describes a supported polymerization catalyst comprising the reaction product of
A) a supported organoaluminium compound which is prepared by
  (i) preparing a suspension of a support containing less than 3% by weight of water in a solution of at least one alkylaluminium compound under inert conditions and
  (ii) hydrolysing the suspension by addition of water to the suspension and
B) a transition metal compound as catalyst.

A further alternative is offered by U.S. Pat. No. 5,026,797 by reaction of previously prepared alkylaluminoxane solutions with silica (predried at 600° C.) at 60° C. and subsequent washing-out of the alkylaluminoxane which has not been immobilized by means of toluene.

U.S. Pat. No. 4,921,825 describes a process for immobilizing alkylaluminoxanes by precipitation from toluene solutions by means of n-decane in the presence of silica.

Some of these processes are technically complicated since they employ, inter alia, low reaction temperatures at the beginning or multistage work-up processes and therefore suffer from losses in yield or the degrees of loading of the support with alkylaluminoxanes necessary for a high catalyst activity can often not be achieved. In addition, the particle morphology of the supported alkylaluminoxane and of the supported transition metal catalyst can be altered in an adverse and undesirable way. The filtration and drying steps sometimes lead to destruction of the carrier particle, resulting in formation of small fragments ('fines') which can lead to reactor fouling in the polymerization. Furthermore, the alkylaluminoxanes prepared by these processes usually have a very broad distribution of the degree of oligomerization, which leads to inhomogeneous supported products.

EP 0 650 967 describes a process for the immobilization of alkylaluminoxanes on support materials, in which a dispersion of alkylaluminoxanes which has been prepared by addition of water to a solution of alkylaluminium compounds in hydrocarbons in a static mixer is immobilized on inert support materials. A disadvantage of this process is that the degree of oligomerization of the alkylaluminoxanes formed changes during the course of the process so that alkylaluminoxane oligomers having a broad distribution of the degree of oligomerization (oligomers having 1–20 units) are obtained (see also EP 0 623 624). The supported alkylaluminoxanes thus do not have the desired homogeneous nature.

It is therefore an object of the present invention to overcome the disadvantages of the prior art and to provide a process in which partial hydrolysates of organometallic compounds, in particular alkylaluminoxanes, immobilized on inert support materials can be obtained in high yield and homogeneity in a reproducible way. The new process should ensure that the degrees of loading can be varied within wide limits, that the particle morphology of the support is retained and that the products are finally obtained as free-flowing powder. The new process should give partial hydrolysis products of organometallic compounds which are immobilized on inert support materials and whose degree of oligomerization can be set to suit the specific process.

A further object of the invention is to provide a process for preparing partial hydrolysis products of organometallic compounds, in particular alkylaluminoxanes, in which partial hydrolysis products of organometallic compounds which have a degree of oligomerization which can be adjusted to suit the specific process are prepared simply, efficiently and in high yield.

The invention provides a process for preparing partial hydrolysates of organometallic compounds, in particular alkylaluminoxanes, immobilized on support materials, which is characterized in that the organometallic compounds and water are continuously introduced into a static mixer in the presence of hydrocarbons and the resulting reaction products are brought into contact with support materials. The resulting reaction products can be obtained in the form of solutions or dispersions, for example lyophilic dispersions in the sol state (cf. Römpp Chemie Lexikon, $9^{th}$ edition, Georg Thieme Verlag Stuttgart, New York 1990, p. 2299 ff). Compared with the prior art, the process of the invention gives a higher space-time yield, higher homogeneity of the resulting partial hydrolysates of organometallic compounds immobilized on inert support materials and simpler control of the degree of loading. The novel process makes it possible to prepare homogeneous supported partial hydrolysis products of organometallic compounds having a degree of oligomerization and constitution which can be adjusted in a targeted manner, which is of great importance because of the influence of the degree of oligomerization of the partial hydrolysis products of organometallic compounds on their activity as cocatalysts in polymerization. Thus, employing the process of the invention results in a narrower particle size distribution of the polymer compared with the prior art. This is always observed when the molar mass is controlled in polyethylene production by introduction of hydrogen, but the distribution of the molar masses is now less pronouncedly bimodal. This result implies that the aluminoxane on which the catalyst is based has a narrower molar mass distribution.

The invention also provides a process for preparing transition metal catalysts immobilized on support materials, which is characterized in that one or more transition metal compounds are added in solid or dissolved form during or, if desired, after the above-described process. Compared with the prior art, the process of the invention gives a higher space-time yield, greater homogenity of the resulting transition metal catalysts immobilized on inert support materials and simpler control of the degree of loading.

The invention further provides a process for preparing partial hydrolysis products of organometallic compounds, in particular aluminoxanes, which is characterized in that the organometallic compounds and water are introduced continuously into a static mixer in the presence of hydrocarbons. Compared with the prior art, the process of the invention gives a higher space-time yield and the resulting partial hydrolysis products of organometallic compounds have a degree of oligomerization which can be adjusted in a targeted manner.

The invention further provides partial hydrolysis products of organometallic compounds immobilized on support materials, wich have been prepared by the process of the invention.

The invention also provides transition metal catalysts immobilized on support materials, prepared according to the process of the invention.

The invention further provides the partial hydrolysis products of organometallic compounds, in particular aluminoxanes, prepared by the process of the invention.

A further subject-matter of the invention is characterized by the claims.

BRIEF DESCRIPTION OF THE FIGURE

The FIGURE schematically shows a flow tube with partial flow return.

According to the invention, preference is given to a process for preparing partial hydrolysates of organometallic compounds immobilized on support materials, in which water and a solution of organometallic compounds in an aliphatic, cycloaliphatic or preferably aromatic hydrocarbon are introduced continuously via a mixing nozzle into a static mixer, preferably a flow tube with coaxial partial flow return, and the resulting solutions or dispersions are brought into contact with inert support materials.

As organometallic compounds, it is in principle possible to use all compounds which can be hydrolysed by means of water to form partial hydrolysis products of organometallic compounds and are customary in this field. The hydrolysis products are, according to the invention, solutions or dispersions. The organometallic compounds are preferably organomagnesium, organozinc or organoaluminium compounds. More preferably, mixed or unmixed alkyl-, aryl- or mixed-substituted alkylaryl- or unsubstituted alkylarylaluminium compounds are used. According to the invention, preference is given to trialkylaluminium compounds having short-chain alkyl radicals ($C_1$–$C_4$). Particular preference is given to trimethylaluminium.

If the process of the invention is carried out using organoaluminium compounds as reactants, the reaction products formed are organoaluminium partial hydrolysates. The partial hydrolysis products formed are preferably solutions or dispersions of aluminoxanes, particularly preferably dispersions of aluminoxanes. For the purposes of the invention, preference is given to dispersions of methylaluminoxanes which have a constitution which is able to be adjusted in a targeted manner as partial hydrolysis products of trimethylaluminium.

For the purposes of the present invention, 'continuous introduction' means a continuous, dual, simultaneous or temporally independent introduction of the two reactants organometallic compounds and water.

In a further embodiment of the invention, the process is characterized by continuous, simultaneous introduction (addition) of water and organometallic compounds in the form of a dual addition to a pure hydrocarbon solvent as solution medium. The addition of organometallic compound can, if desired, be carried out simultaneously or offset in time. The alkylaluminium compounds are preferably introduced as solutions in hydrocarbons.

The support material can be present in the mixture during the preparation of the solution or dispersion or else can be brought into contact with the solution or dispersion after preparation of the latter or can be metered in synchronously with this solution or dispersion. The continuous dual addition makes it possible for the desired degree of hydrolysis to be set precisely, as a result of which optimum control of the degree of oligomerization and optimal application to a support and immobilization of the partial hydrolysates of organometallic compounds can be achieved.

The way in which the reactor (FIGURE), as described, for example, in DE-A-25 16 284, functions is based on a liquid driving jet in the internal tube which transmits momentum to the entire contents of the reactor and thus generates strong circulation. As a result, the flow of circulating liquid in the reactor is about 8–10 times as high as the volume flow of the driving jet.

In the process of the invention, water and the organometallic compounds, preferably trialkylaluminium, are introduced in a volume flow ratio of from 1:2000 to 1:40 000, preferably 5000–20 000, via the single-component or multicomponent mixing nozzle into the flow tube with coaxial partial flow return.

The molar ratio of water to alkylaluminium compounds in the reaction is in the range 0.5–1.3:1, preferably 0.6–0.9:1.

The flow tube with coaxial partial flow return ensures good and extremely rapid mixing of the organometallic compounds, preferably aluminium alkyl compounds, with water as a result of the strong circulation. Owing to the high primary dispersion, regions of excessively high water concentration, which would otherwise lead to yield losses due to the formation of aluminium hydroxide and to an undesirably high proportion of unreacted trialkylaluminium, can be avoided. In addition, the small reactor volume makes it possible to remove the high heat of reaction rapidly and safely.

The mean degree of oligomerization n, which is reflected in the mean molar mass of the reaction product, can be influenced in a targeted manner by appropriate introduction of the reactants and control of the reaction parameters. According to the invention, the degree of oligomerization can be set in a targeted manner within a very wide range, which has a significant influence on the constitution of the partial hydrolysates which thus display a high homogeneity. A narrow distribution of the degree of oligomerization can be achieved in this way. In the process of the invention, the molar ratio $H_2O$/trialkylaluminium, in particular in the case of TMA, can be set to the desired value. This is of particular importance since the activity of aluminoxanes as cocatalyst in olefin polymerization is obviously dependent on the degree of oligomerization and the constitution of the aluminoxane used (W. Kaminsky, Nachr. Chem. Tech. Lab. 29, 373–7 (1981), W. Kaminsky et al., Makromol. Chem., Macromol. Symp. 3, 377–87 (1986)).

Support materials which can be used according to the invention are the porous oxides of one or more of the elements of groups II, III and IV of the Periodic Table, e.g. silica, $ZrO_2$, $TiO_2$, $B_2O_3$, CaO, ZnO, BaO, zeolites, bentonites, preferably $Al_2O_3$, alumina and MgO and particularly preferably $SiO_2$, and also polymers.

The support materials can have particles sizes in the range 1–300 μm, preferably 10–200 μm; surface areas of 10–800 $m^2/g$, in particular 100–500 $m^2/g$; and $N_2$ pore volumes of 0.5–7 $cm^3$, preferably 1–2 $cm^3$.

These supports are commercial materials which have the indicated values in the random distribution.

The water content of the support materials should be <10% by weight, preferably <6% by weight and in particular <1% by weight. If necessary, the commercial support materials are therefore dried at temperatures of 50–1000° C., preferably 100–500° C., for 2–20 hours, if desired under reduced pressure, before use.

The application and immobilization of the partial hydrolysates of organometallic compounds to/on the support materials is carried out either in a second reaction vessel in which the support material is present as a suspension or a filter cake and through which the solution or dispersion formed in the flow tube with coaxial partial flow return is passed while the mixture is simultaneously homogenized, or by synthesis of the solution or dispersion directly in the presence of the support. The solvent is then removed from these mixtures, if desired under reduced pressure and/or by filtration.

The original particle morphology of the support material is not changed by this procedure.

The ratio of support to aluminoxane can be varied within relatively wide limits; according to the invention, it is selected so that 5–40% by weight, preferably 8–25% by weight, of aluminium in the form of aluminoxanes is present on the resulting free-flowing powder composed of support material and aluminoxane (see examples).

The process of the invention makes it possible to prepare supported aluminoxanes with virtually quantitative yields of immobilized aluminium, based on trialkylaluminium compounds used, without technically complicated process steps. Owing to parameters which can be set in a targeted manner and reproducible process conditions, the cocatalysts or supported partial hydrolysates of organometallic compounds prepared by the process of the invention, which are likewise subject-matter of the present invention, in particular alkylaluminoxanes and particularly preferably methylaluminoxane, display a high homogeneity and high activities as cocatalysts and are therefore particularly well suited for the further preparation of catalyst systems for olefin polymerization.

Another aspect of the invention is a process for preparing transition metal catalysts immobilized on support materials, which is characterized in that one or more transition metal compounds are added in solid or dissolved form during or, if desired, after the above-described process.

As transition metal compounds, it is in principle possible to use all compounds customary in this field. Preferred compounds are those of metals of group IVa of the Periodic Table of the chemical elements. They include sandwich and semisandwich complexes.

These transition metal compounds have monocyclic, bicyclic or polycyclic ligands such as cyclopentadienyl, indenyl or fluorenyl, which may be substituted or unsubstituted. The transition metal compounds can be used as alkyl compounds, as halide compounds, as aryl or alkylaryl compounds or else as alkoxy compounds.

When the transition metal compounds are introduced in dissolved form, saturated, unsaturated or halogen-containing hydrocarbons are particularly useful as solvents. The molar ratio of transition metal compound to aluminium in the form of aluminoxane is from about 1:10 to 1:1000, preferably from 1:50 to 1:200.

This process according to the invention makes it possible to prepare supported transition metal catalysts without technically complicated process steps. Owing to parameters which can be set in a targeted manner and reproducible process conditions, the supported transition metal catalyst prepared using the process of the invention, which are likewise subject-matter of the invention, display high activities and productivities in olefin polymerization.

Further aspects of the invention are the process for preparing partial hydrolysates or organometallic compounds, in particular alkylaluminoxanes, which is characterized in that organometallic compounds, in particular alkylaluminium compounds, and water are introduced continuously into a static mixer in the presence of hydrocarbons, and the products which can be prepared by this process. The preferred embodiments of this process have been discussed in detail above in the context of the process for preparing partial hydrolysates of organometallic compounds, in particular alkylaluminoxanes, immobilized on support materials.

The invention is illustrated below by means of examples.

The following examples indicate the field of application of the present invention and do not imply any restriction. Percentages are, unless indicated otherwise, percentages by mass.

EXAMPLES

Example 1

3.5 kg of trimethylaluminium and 0.608 kg of water are fed simultaneously into a flow tube with coaxial partial flow return. 185 kg of toluene are used as solvent. The feed rates are 0.875 kg/h for trimethylaluminium and 0.152 kg/h for water. During the metered addition time of four hours, the dispersion formed is circulated. The dispersion is then placed in a reactor together with 5.50 kg of $SiO_2$ and stirred for about 1 hour. The solvent is removed by filtration and drying under reduced pressure.
Yield: 8.1 kg
Aluminium content: 15.8% by weight
Methyl/aluminium ratio: 1.25

Example 2

The procedure of Example 1 is repeated, but after the solvent has been removed by filtration the end product is additionally treated with a suspension of 0.162 kg of $Et[H_4Ind]_2ZrCl_2$ in 125 kg of toluene. After the solid has been filtered off again, it is dried under reduced pressure.
Yield: 8.3 kg
Aluminium content: 15.4% by weight
Zirconium content: 0.42% by weight
Methyl/aluminium ratio: 1.25

Example 3

6.0 kg of trimethylaluminium and 1.044 kg of water are fed simultaneously into a flow tube with coaxial partial flow return. 185 kg of toluene are used as solvent. The feed rates are 1.0 kg/h for trimethylaluminium and 0.174 kg/h for water. Otherwise, the procedure is as in Example 1.
Yield: 9.7 kg
Aluminium content: 22.5% by weight
Methyl/aluminium ratio: 1.40

Example 4

The procedure of Example 3 is repeated, but after the solvent has been removed by filtration the end product is additionally treated with a suspension of 0.407 kg of $Et[H_4Ind]_2ZrCl_2$ in 125 kg of toluene. After the solid has been filtered off again, it is dried under reduced pressure.
Yield: 10.1 kg
Aluminium content: 21.6% by weight
Zirconium content: 0.86% by weight
Methyl/aluminium ratio: 1.40

Example 5

Firstly, the procedure of Example 1 is repeated. However, after each hour during the metered addition, 1.4 kg of $SiO_2$ is introduced a little at a time into the dispersion circuit. The product is then stirred further for about 1 hour, filtered and dried under reduced pressure.
Yield: 8.3 kg
Aluminium content: 15.4% by weight
Methyl/aluminium ratio: 1.15

Example 6

5.50 kg of $SiO_2$ together with 185 kg of toluene are placed in a circulation system. 3.5 kg of trimethylaluminium and 0.614 kg of water are fed simultaneously into a flow tube with coaxial partial flow return which is integrated into the circulation system. The feed rates are 3.5 kg/h for trimethylaluminium and 0.614 kg/h for water. During the metered addition time of one hour, the dispersion formed is circulated. The dispersion is then placed in a reactor and stirred for about 1 hour. The solvent is removed by filtration and drying under reduced pressure.
Yield: 6.2 kg
Aluminium content: 12.7% by weight
Methyl/aluminium ratio: 1.10

Example 7

105 kg of toluene are placed in a circulation system. 6.8 kg of $SiO_2$, 3.7 kg of trimethylaluminium and 0.593 kg of water are fed indirectly or directly and simultaneously into a flow tube with coaxial partial flow return which is intergrated into the circulation system. The feed rates are 6.8 kg/h for $SiO_2$, 3.7 kg/h for trimethylaluminium and 0.593 kg/h for water. During the metered addition time of one hour, the dispersion formed is circulated. The remaining procedure is as in Example 6.

This example gave an improvement in the particle morphology and homogeneity of the end product compared with Example 5.
Yield: 8 6 kg
Aluminium content: 10.8% by weight
Methyl/aluminium ratio: 1.25

What is claimed is:

1. Process for preparing partial hydrolysates of organometallic compounds immobilized on support materials, characterized in that the organometallic compounds and water are continuously introduced for an effective metered period of time into a static mixer us the presence of hydrocarbons and the resulting reaction products are brought into contact with support materials.

2. Process according to claim 1, characterized in that solutions or dispersions of partial hydrolysates or organometallic compounds are formed as reaction products.

3. Process according to claim 1 or 2, characterized in that organomagnesium, organozinc or organoaluminum compounds are used as organometallic compounds.

4. Process according to claim 1 or 2, characterized in that mixed or unmixed alkyl-, aryl- or mixed- substituted alkaryl- or unsubstituted alkaryl-aluminum compounds are used as organonmetallic compounds.

5. Process according to claim 3, characterized in that aluminoxanes are formed as partial hydrolysis products of organoaluminum compounds.

6. Process according to claim 5, characterized in that solutions or dispersions of aluminoxanes are formed.

7. Process according to claim 4, characterized in that solutions or dispersions of methylaluminoxanes are formed as partial hydrolysis products of trimethylaluminum.

8. Process according to claim 7, characterized in that methylaluminoxanes having a specifically set constitution are formed.

9. Process according to claim 1, characterized in that the static mixer used is a flow tube with coaxial partial flow return.

10. Process according to claim 1, characterized in that the process is carried out in the presence of aromatic hydrocarbons.

11. Process according to claim 1, characterized in that water and aluminum alkyl compounds are used in a molar ratio of 0.5–1.3:1.

12. Process according to claim 4, characterized in that the alkylaluminum compounds are introduced as solutions in hydrocarbons.

13. Process according to claim 1, characterized in that porous solids having a surface area of 100–800 m² and a pore volume of from 0.5 to 7 cm³ are used as support materials.

14. Process according to claim 13, characterized in that $SiO_2$, zeolites, alumina, polymers or bentonites, preferably silica, if desired having a water content of <10% by weight, are used as porous solids.

15. Process according to claim 1, characterized in that the introduction of the organometallic compound way be carried out simultaneously or offset in time.

16. Process according to claim 1, characterized in that 5–40% by weight of aluminum in the form of aluminoxanes is immobilized on the support material.

17. Process according to claim 2, characterized in that the support material is present in the mixture during the preparation of the solution or dispersion.

18. Process according to claim 2, characterized in that the support material is brought into contact with the solution or dispersion after the latter has been prepared.

19. Cocatalyst comprising partial hydrolysis products of organometallic compounds immobilized on support materials, able to be prepared by a process according to claim 1.

20. Process for preparing transition metal catalysts immobilized on support materials, characterized in that one or more transition metal compounds are added in solid or dissolved form during or, if desired, after a process according to claim 1.

21. Process according to claim 20, characterized in that one or more metallocene complexes is/are used as transition metal compounds.

22. Transition metal catalyst able to be prepared by a process according to claim 20 or 21.

23. Process for preparing partial hydrolysis products of organometallic compounds, characterized in that the organometallic compounds and water are introduced continuously for an effective metered period of time into a static mixer in the presence of hydrocarbons.

24. Process according to claim 23, characterized in that organomagnesium, organozinc or organoaluminum compounds are used as organometallic compound.

25. Process according to claim 24, characterized in that trialkylaluminum compounds are used as organometallic compounds.

26. Process according to claim 11, characterized in that water and aluminum alkyl compounds are used in a molar ratio of 0.6–0.9:1.

27. Process according to claim 13, characterized in that $SiO_2$, zeolites, alumina, polymers or bentonites, preferably silica, if desired having a water content of <6% by weight are used as porous solids.

28. Process according to claim 16, characterized in 8–25% by weight of aluminum in the form of aluminoxanes is immobilized on the support material.

* * * * *